United States Patent [19]

Shirasaka et al.

[11] 4,432,807
[45] Feb. 21, 1984

[54] METHOD OF EXFOLIATING COATING OF COATED OPTICAL FIBER

[75] Inventors: Yusei Shirasaka; Kenichi Fuse; Haruo Umezu, all of Ichihara, Japan

[73] Assignee: The Furukawa Electric Co., Ltd., Tokyo, Japan

[21] Appl. No.: 358,003

[22] Filed: Mar. 15, 1982

[30] Foreign Application Priority Data

Mar. 25, 1981 [JP] Japan .................................. 56-43495

[51] Int. Cl.³ .......................... C03C 23/00; B08B 7/00
[52] U.S. Cl. ............................................ 134/2; 65/2; 65/23; 134/6
[58] Field of Search .................... 134/2, 6; 65/2, 23

[56] References Cited

U.S. PATENT DOCUMENTS 3,357,693  4/1968  Hougen ........................... 134/6 X
4,312,571  1/1982  Ganzhorn ........................ 134/2 X

FOREIGN PATENT DOCUMENTS 678867  9/1952  United Kingdom ................. 134/6

Primary Examiner—Robert L. Lindsay, Jr.
Attorney, Agent, or Firm—George B. Oujevolk

[57] ABSTRACT

A method of exfoliating the coating of a coated optical fiber is described. A crack in the coating layer of the optical fiber is produced by bending means, cleaving the coating into a plurality of cleaved strip pieces while longitudinally enlarging the crack, and then cutting the strip pieces with an advantageous exfoliating tool. The exfoliating tool thus used is constructed to conveniently cleave the coating layer of the optical fiber and to cut the cleaved strip pieces. It does not damage the optical fiber upon exfoliating of the coating layer from the coated optical fiber, and can efficiently exfoliate the coating of the optical fiber.

14 Claims, 29 Drawing Figures

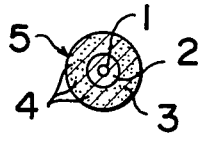
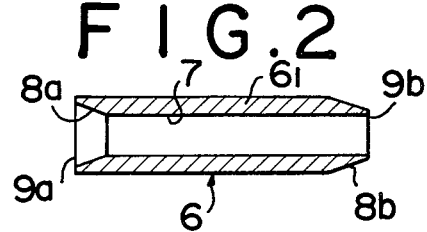
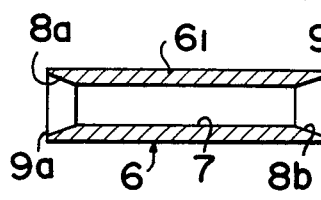
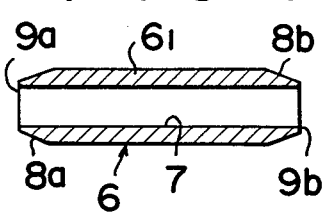
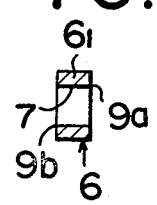
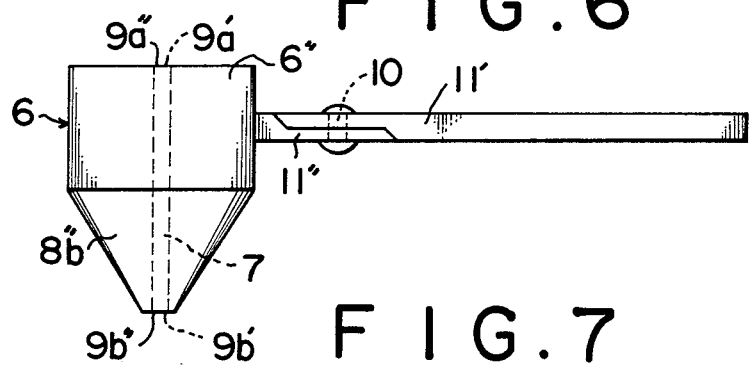
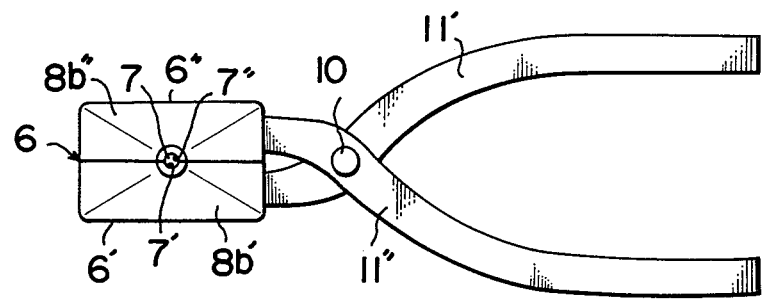

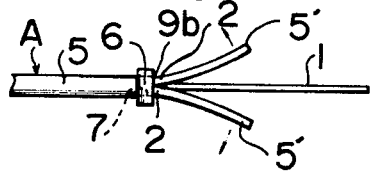
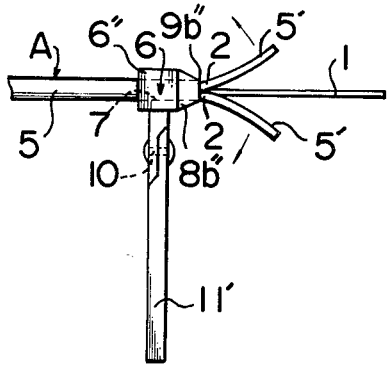
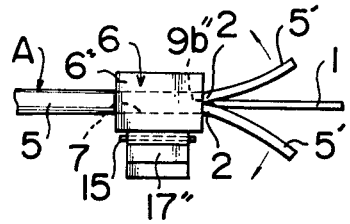
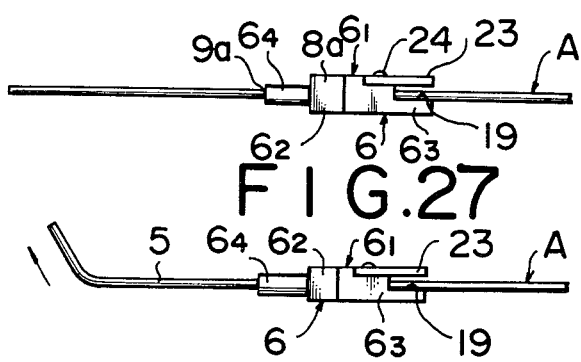
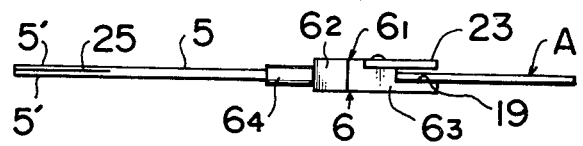
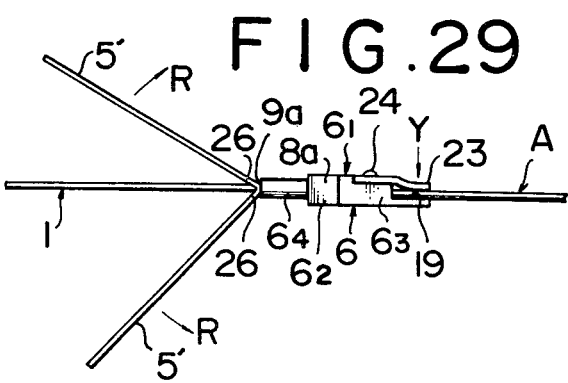

METHOD OF EXFOLIATING COATING OF COATED OPTICAL FIBER

BACKGROUND OF THE INVENTION

This invention relates to a method and tool for exfoliating the coating of a coated optical fiber and, more particularly, to a method of exfoliating the coating layer on the outer periphery of an optical fiber, in which layer, a fibrous material is longitudinally contained, e.g., a reinforced coating optical fiber, and, a tool for exfoliating such a coating of the optical fiber.

A general reinforced coating optical fiber is, as shown in FIG. 1, constructed in its cross section, and is manufactured as hereinafter described.

Fibrous materials 4, 4, 4, . . . such as glass fiber, carbon fiber or the like are applied longitudinally on the outer periphery of a primary coating layer 2 formed on an optical fiber 1 and impregnated with the thermosetting resin 3. The thermosetting resin 3 containing the fibrous materials 4, 4, 4, . . . is thermally set to form a predetermined coating layer 5. The coated optical fiber thus manufactured has the coating layer 5 in which the fibrous material is contained, and thereby exhibits excellent mechanical properties and temperature characteristic.

Since the coating layer 5 of the coated optical fiber has excessively high mechanical properties, the work of exfoliating the coating of the optical fiber at the time of connecting the optical fiber cannot be performed smoothly, and a variety of problems occur, e.g., accidental damage to the optical fiber 1, early wear of a cutting tool for exfoliating the coating of the optical fiber, etc.

OBJECTS OF THE INVENTION

Accordingly, a primary object of this invention is to provide a method of exfoliating the coating of a coated optical fiber, which can be performed easily without difficulty by simply producing cracks along the curved and tapered surface of the end of the coated optical fiber.

Another object of this invention is to provide a method of exfoliating the coating of a coated optical fiber, which can easily exfoliate the coating by securely holding the end of the optical fiber in a drawing hole.

Yet another object of this invention is to provide a method of exfoliating the coating of a coated optical fiber, which can accurately cut the coating without slip of the end of the optical fiber.

A further object of this invention is to provide a tool for exfoliating the coating of the coated optical fiber, which can readily introduce the end of the optical fiber into the drawing hole with tapered part.

Still another object of this invention is to provide a tool for exfoliating the coating of the coated optical fiber, which can efficiently exfoliate the coating without damage to the optical fiber and without difficulties in the respective steps of exfoliating the coating by producing cracks and forming a plurality of split coating pieces and then cutting the coating pieces.

Still another object of the invention is to provide a tool for exfoliating the coating of the coated optical fiber, which can easily exfoliate the coating without early wear of the tool by means of bending breakdown due to the physical properties of the coating layer.

The above and other related objects and features of the invention will be apparent from the following detailed description taken together with the accompanying drawings in which:

BRIEF DESCRIPTION OF THE DRAWINGS

FIGS. 1 through 15 are explanatory views showing a variety of preferred embodiments of a tool for exfoliating the coating of a coated optical fiber according to the present invention;

FIGS. 23 through 25 are views showing the steps of exfoliating the coating of the optical fiber by executing the method of exfoliating the coating with the tools shown in FIGS. 5, 6 and 7, and 11, respectively; and FIGS. 26 through 29 are views of the steps of executing the method of exfoliating the coating of the optical fiber according to the present invention by using the tool shown in FIGS. 13 through 15.

DESCRIPTION OF THE PREFERRED EMBODIMENTS

Figure 8:
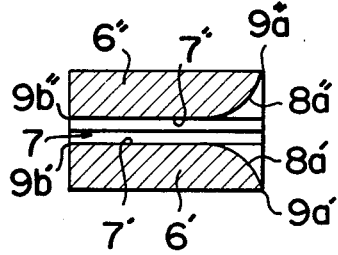

Reference is now made to the drawings, particularly to FIGS. 1 through 15, which show preferred embodiments of the method of exfoliating the coating of the coated optical fiber and the tool for exfoliating the coating according to the present invention, wherein like reference numerals designate equal or equivalent components and parts in the respective views.

The coated optical fiber to be exfoliating according to the present invention has, as shown in FIG. 1, a coating layer 5 in which fibrous materials 4, 4, 4, . . . are contained. More concretely, the optical fiber 1 is formed of quartz glass, Vycor glass, Pyrex glass, multiple component glass, plastic or the like. The primary coating layer 2 is formed of silicone, polyurethane, polyamide, polyimide or the like. The thermosetting resin 3 is formed of polyester, epoxy resin or the like, and the fibrous materials, 4, 4, 4 . . . are formed of glass fiber, carbon fiber, aromatic polyamide fiber, ceramic fiber, molten silica fiber or the like.

On the other hand, the exfoliating tool 6 used in the method of the present invention is shown in FIGS. 2 through 15.

In FIG. 2, the exfoliating tool 6 is formed in a sleeve shape. The body $6_1$ of the tool 6 having a drawing hole 7 for the coated optical fiber has tapered parts 8a, 8b on the inner periphery of one end and on the outer periphery of the other end, and knife edges 9a, 9b at both ends.

Further, as shown in FIGS. 3 and 4, the exfoliating tool 6 is formed in a sleeve shape. In FIG. 3, the body $6_1$ has tapered parts 8a, 8b on the inner peripheries of both ends. In FIG. 4, the body $6_1$ has tapered parts 8a, 8b on the outer peripheries of both ends.

These exfoliating tools 6 and the tools of various embodiments, which will be hereinafter described, are so constructed that the bodies are formed of glass, ceramic, engineering plastic, FRP or the like in such a manner that the inner diameter of the intermediate part is slightly larger than the outer diameter of the coating layer 5.

It is noted that the exfoliating tool 6 shown in FIG. 2 may have only one tapered part, 8a or 8b or may be without the tapered parts 8a, 8b.

In FIG. 5, the exfoliating tool 6 is formed of the same material as described above in a ring shape, and has no tapered parts 8a, 8b, but has a drawing hole 7 and knife edges 9a, 9b.

In FIGS. 6 and 7, the body of the exfoliating tool 6 is divided into a pair of split pieces 6', 6", which have recess grooves 7' and 7" formed on the confronting surfaces thereof to form a drawing hole 7 in the confronted contacted state.

The tapered parts and the knife edges of the exfoliating tool 6 having the above split pieces 6', 6" are designated by 8b', 8b"; 9a', 9a"; 9b', 9b"', respectively in a half-split state.

In the exfoliating tool 6 having a pair of the split pieces 6', 6", the split pieces 6', 6" are respectively mounted at the ends of grips 11', 11" pivotally secured in X shape via a pin 10 as a pivotal fulcrum in such a manner that the split pieces 6', 6" are relatively opened or closed via the grips 11', 11".

Figure 9:
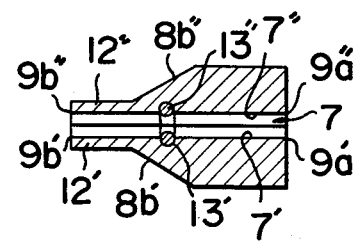
Figure 10:
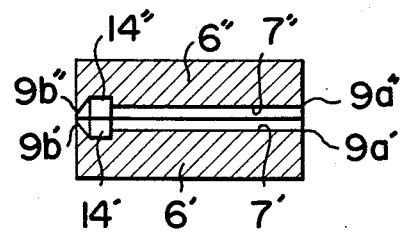

In FIGS. 9 and 10, the exfoliating tool 6 has a pair of split pieces 6', 6" in the same manner as the tool shown in FIGS. 6 and 7, and which are similarly mounted at grips 11', 11" to those shown in FIGS. 6 and 7.

In FIG. 8, the exfoliating tool 6 having split pieces 6', 6" is featured by tapered parts 8a', 8a", each having a curved surface on the inner periphery of one end.

In FIG. 9, the exfoliating tool 6 having split pieces 6', 6" advantageously has half-split reduced-outer diameter columns 12', 12" formed at the ends of the tapered parts 8b', 8b" formed on the outer periphery of one end thereof, and anti-skid structures 13', 13" buried with circular member (made of rubber, plastic or the like) having high frictional coefficient on the inner peripheries of the recess grooves 7', 7" respectively.

In FIG. 10, the exfoliating tool 6 having split pieces 6', 6" advantageously has acute knife edges 9a', 9a" functioning also as the anti-skid structures 13', 13" formed on the inner peripheries of one end thereof, and recesses 14', 14" formed internally therein.

Figure 11:
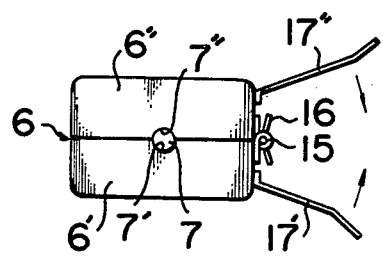

In FIG. 11, in the exfoliating tools 6 shown in FIGS. 6, 7, 8, 9 and 10, the split pieces 6', 6" are relatively openly connected via a hinge 15 instead of the grips 11', 11", a coil spring 16 or a leaf spring is mounted to constantly close the split pieces 6', 6" in confronted manner, and knobs 17', 17" are respectively mounted on the split pieces 6', 6".

Figure 12:
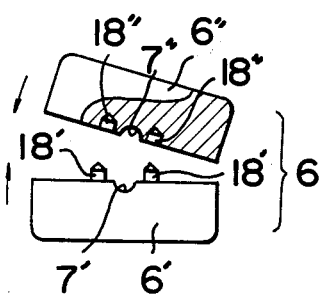

In further FIG. 12, in the exfoliating tool 6 shown in FIGS. 6, 7, 8, 9, 10, 11, escape preventive pins 18', 18 are projected at both sides of the recess groove 7' of the split piece 6', and pin holes 18", 18", in which the pins 18', 18' are respectively engaged, are formed at both sides of the recess groove 7" of the split piece 6".

It is noted that the exfoliating tools 6 of various embodiments described in the foregoing may take a circular, square, rectangular, or any other sectional shape; but it is desired that the drawing hole 7 should be similar in cross section to the coating layer 5. Hence the section of the hole 7 is circular when that of the coating layer 5 is circular and square or rectangular when that of the hole 7 is square or rectangular.

It is also noted that, when the exfoliating tool 6 is formed of a pair of split pieces 6', 6", similar anti-skid structures 13', 13" may be provided at the split pieces 6', 6" having no anti-skid structures 13', 13" shown in FIGS. 6, 7, 8 and that these two structural functions may be independently formed in the anti-skid structures operated with the knife edges 9a', 9a" shown in FIG. 10.

It is also noted that the inner diameters of the anti-skid structures 13', 13" should be smaller than the outer diameter of the coating layer 5 partly or entirely.

Figure 13:
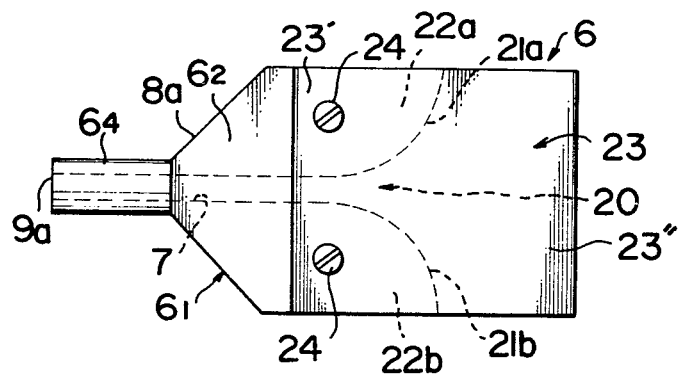
Figure 14:
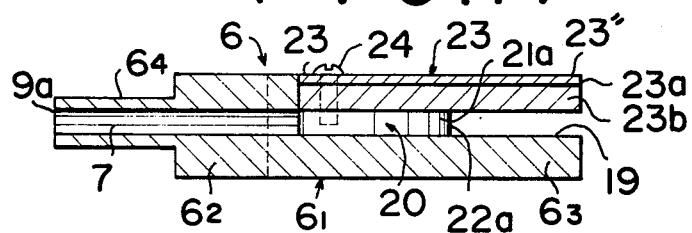

In the exfoliating tool 6 shown in FIGS. 13 and 14, the body $6_1$ is formed of a front side body $6_2$ and a rear side body $6_3$ adjacent to each other.

The front side body $6_2$ has a coated optical fiber drawing hole 7 therein, and further has an outer diameter tapered from the rear end to the intermediate and formed of small circular shape from the intermediate to the front end and accordingly has an integral structure of a tapered part 8a and a reduced-outer diameter cylindrical part $6_4$.

The intersection between the front end face of the front side tapered part and the inner peripheral surface forming the drawing hole 7 becomes a knife edge 9a.

On the other hand, the rear side body $6_3$ is thinner than the tapered part 8a of the front side body $6_2$ thus formed, and has an inner surface 19 for holding the coated optical fiber 1.

Further, the holding surface 19 has convergent guide surfaces 21a, 21b which gradually reduce the guide space 20 toward the drawing hole 7.

In the embodiment exemplified in FIGS. 13 and 14, the guide surfaces 21a, 21b are formed of arcuate projections 22a, 22a, 22b formed by partly projecting the holding surfaces 19 in curved sector-shaped trapezoidal forms with inner arcuate peripheral surfaces in such a manner that the confronting surfaces of the guide surfaces 21a, 21b form the guide space 20.

It is noted that the minimum width of the guide space 20 continued to the rear end of the drawing hole 7 is substantially equal to the diameter of the drawing hole 7 of circular section and that the outer diameter of the drawing hole 7 is slightly larger than the outer diameter of the coated optical fiber.

It is noted that, when the sectional shape of the coated optical fiber is square or rectangular, the sectional shape of the drawing hole 7 is also made square or rectangular.

At a predetermined position of the body $6_1$ is formed a flexible push piece 23 one end of which is a stationary end 23' and the other end a free end 23".

This push piece 23 is superposed at the stationary end 23' on the projections 22a, 22b, and is clamped at the stationary end 23' with screws 24, 24 to the projections 22a, 22b and hence to the body $6_1$. The push piece 23 extends at the free end 23" onto the holding surface 19 in this state, and is retained between the free end 23" and the holding surface 19.

The materials and other preferred examples of the body $6_1$ and the push piece 23 will be hereafter described.

The body $6_1$ is preferably formed of metal, FRP, ceramic or the like, which has a suitable hardness and mechanical strength, and should be formed of an integrally molded or machined article with single material and of the material having predetermined mechanical strength only at the cylindrical part $6_4$.

For instance, the body 6 having no cylindrical part $6_4$ is formed of plastic, and a metallic cylinder having a drawing hole 7 functioning also as a cylindrical part $6_4$ is inserted from the tapered part 8a into the front side body $6_2$.

It is also noted that the cylindrical part $6_4$ may be entirely omitted.

The guide surfaces 21a, 21b forming the guide space 20 are arcuate in the previous embodiment, but may also be formed of linearly tapered surfaces, and may further be formed of expanded tapered inner peripheries of the rear end of the drawing hole 7, in which case the flexible push piece 23 may be mounted on the upper surface of the tapered part 8a.

Further, the push piece 23 is preferably formed of elastic single metal, or flexible single rubber, plastic or the like, and may also be formed, as shown in FIGS. 13 and 14, of two laminated plates 23a, 23b, 23a being a plate of a metallic spring material, and 23b a sheet of rubber or plastic.

Figure 20:
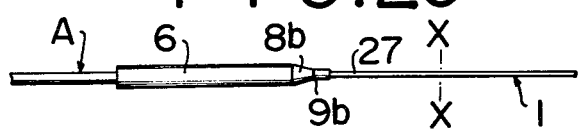
Figure 21:
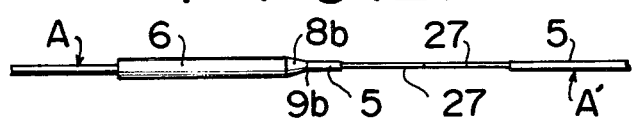

A method of exfoliating the coating of the coated optical fiber with the exfoliating tool 6 shown in FIG. 2 will be described with reference to FIGS. 16 through 19, and the preferred example of the optical fiber thus exfoliated will be described with reference to FIGS. 20 through 22, wherein the coated optical fiber will be designated by reference characters A, A'.

Figure 16:
FIGS. 16 through 22 are views of the steps of executing the method of exfoliating the coating of the optical fiber according to the present invention using the tool shown in FIG. 2 and views of the steps of connecting the optical fiber thus exfoliated.

The method exemplified in this embodiment initially employs the exfoliating tool 6 of sleeve shape as shown in FIG. 16, which tool 6 is engaged on the outer periphery of the coated optical fiber A, and is moved to the position designated by solid lines.

Figure 17:
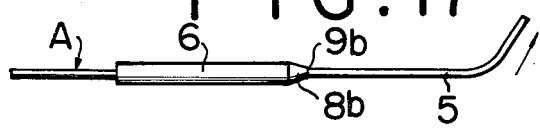

Then, the end of the coated optical fiber A is bent, as shown in FIG. 17, in the direction of an arrow, and the coating layer 5 is thus cracked and divided.

Figure 18:
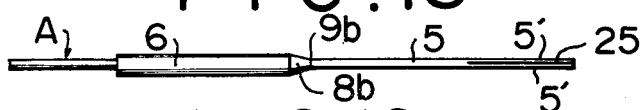

Thus, the coating layer 5 of the coated optical fiber is cleaved between the fibrous materials 4, 4, 4, . . . of longitudinally parallel state, and a crack 25 is thus caused to the layer along the longitudinal direction of the coated optical fiber as shown in FIG. 18, and the cracked coating layer 5 is cleaved in the cracked state at least into more than two cleaved strip pieces 5', 5', . . .

Figure 19:
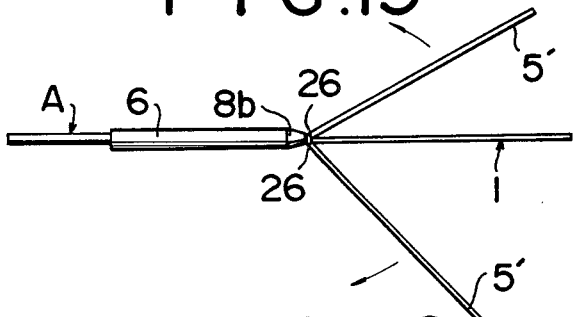

As shown in FIG. 19, the cleaved strip pieces 5', 5', . . . of the optical fiber 1 are longitudinally grown at the crack while being exfoliated from the outer periphery of the optical fiber 1, are further pressed at the bent parts 26, 26 thereof strongly in contact with the knife edges 9a', 9a" of the exfoliating tool 6 while being bent into the direction of arrows, and are thus cut from the bent parts 26, 26 thereof.

As herein before described, predetermined exfoliating work can be completed, and after this work has been completed, the optical fiber can be connected as below.

The optical fiber 1 is exposed at the end of the coated optical fiber A thus exfoliated as above as the exfoliated part 27. The exfoliated part 27 of the optical fiber 1 is vertically cut, as shown by the line X—X in FIG. 20, therealong, and the cut end face of the optical fiber is mirror-polished.

Another coated optical fiber A' to be connected to the coated optical fiber A is, on the other hand, exfoliated through the same steps as above and polished at the end. Then, the exfoliated parts 27, 27 of the coated optical fibers A, A' are butted by the ordinary method as shown in FIG. 21, and the butted ends are fused together by an electric discharge heating, a laser heating or the like to form a splice.

Figure 22:
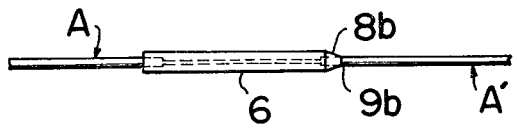

Thereafter, the exfoliating tool 6 attached only to the one coated optical fiber A (or A') is applied, as shown in FIG. 22, over the connecting parts of both coated optical fibers and fitted with an adhesive fed from both ends of the exfoliating tool 6.

It is noted that, when the coated optical fibers are thus connected with the exfoliating tool, the tool 6 can also be utilized as the reinforcing sleeve at the connecting parts of the optical fibers.

It is also noted that the exfoliating tool 6 may be slipped over the coated optical fiber A after the coating layer 5 is cracked as shown in FIG. 18.

The exfoliating tool 6, when not used as the reinforcing sleeve for the connecting parts, is extracted from the end of the coated optical fiber after exfoliation of the coating of the optical fiber so as to be used for next exfoliating work.

It is to be observed that the method of exfoliating the coating of the coated optical fiber with the exfoliating tool 6 of sleeve shape shown in FIGS. 3 and 4 may be performed in the same manner as that disclosed in FIG. 2 so that the tool 6 of sleeve shape can be used as the reinforcing sleeve.

When the coated optical fiber is exfoliated with the exfoliating tool 6 of ring shape shown in FIG. 5, the steps of cracking the coating of the coated optical fiber and mounting the exfoliating tool thereon are carried out in a manner similar to the previous embodiment of the method, and then the cleaved strip pieces 5', 5' are removed as shown in FIG. 23.

The method of another preferred embodiment of exfoliating the coating of the coated optical fiber with the operable exfoliating tool 6 shown in FIGS. 6 through 11 carries out in the arbitrary sequence the steps of cracking the coating layer of the coated optical fiber, mounting the exfoliating tool thereon, and then cuts the cleaved strip pieces 5', 5' in the step of removing the coating layer as shown in FIGS. 24 and 25. This method opens or close the split pieces 6', 6' with the grips 11', 11" and the knobs 17', 17", respectively in the step of mounting the exfoliating tool, and then engages the end of the coated optical fiber A in the drawing hole 7 with the recess grooves 7', 7".

It is noted that, when the end of the coated optical fiber is bent along the tapered parts 8a', 8a" or the like in this case, the crack 25 can readily take place.

According to the method of this embodiment, when the escape preventive pins 18', 18" shown in FIG. 12 are provided at both sides of the recess groove 7', they can prevent the reluctant escape of the end of the coated optical fiber A engaged within the recess groove 7', and the end of the coated optical fiber can be held in the drawing hole 7 without fail by engaging the end of the coated optical fiber within the recess groove 7' and closing the split pieces 6', 6".

Also, according to the method of this embodiment employing the exfoliating tool in which the anti-skid structures 13', 13" shown in FIG. 9 are provided in the recess grooves 7', 7" and/or further the knife edges 9b', 9b" shown in FIG. 10 are functioned also as the anti-skid structures, it can prevent the slippage of the end of the coated optical fiber in the drawing hole 7, and can also accurately cut the cleaved strip pieces 5', 5' without slippage.

It is further noted that, when the exfoliating tool 6 of sleeve shape shown in FIG. 2 has the tapered part 8a on one inner peripheral end, it can readily carry out the operation of drawing the end of the coated optical fiber into the drawing hole 7.

Figure 15:
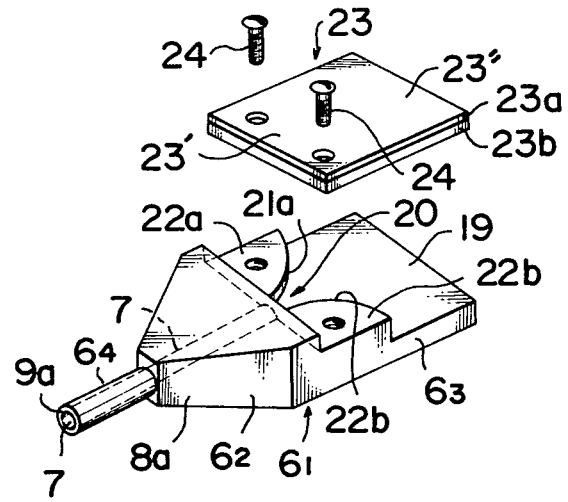

A method of exfoliating the coating of the coated optical fiber with the exfoliating tool 6 shown in FIGS. 13 through 15 of still another preferred embodiment according to the present invention will be described with reference to FIGS. 26 through 29. This method initially introduces the end of the coated optical fiber A along the direction of an arrow as shown in FIG. 26 into the drawing hall 7 in the same manner as the previous embodiment, and draws the coated optical fiber into the hole 7 via the guide surfaces 21a, 21b forming the guide space 20 in this case.

Then, the end of the coated optical fiber A is bent in the direction of an arrow as shown in FIG. 27, and the coating layer 5 of the optical fiber is cracked and divided in this manner.

Thus, the coating layer 5 of the coated optical fiber is given a crack 25 along the longitudinal direction of the coated optical fiber as shown in FIG. 28 in the same manner as in the previous embodiment, and the cracked coating layer 5 is cleaved at least into more than two cleaved strip pieces 5', 5', . . . .

Thereafter, this method prevents the displacement of the coated optical fiber A with the holding surface 19 of the push piece 23 and the rear side body 6₃ while the push piece 23 is deflected in the direction of an arrow Y in FIG. 29, grows the crack 25 while exfoliating the cleaved strip pieces 5', 5', . . . from the outer periphery of the optical fiber 1, further strongly presses at the bent parts 26, 26 in contact with the knife edge 9a at the front end of the cylindrical part 6₄ while bending the cleaved strip pieces 5', 5', . . . in the direction of arrow Y, and thereby cuts the cleaved strip pieces 5', 5'.

In the method of this embodiment, the steps as shown with respect to FIG. 26 may be reversely carried out from the steps as shown with respect to FIG. 27 at the time of exfoliating the coating of the coated optical fiber.

It is noted that the step of producing the crack 25 at the end of the coated optical fiber can be simply carried out by bending the end of the optical fiber along the guide surfaces 21a or 21b.

The cleaved strip pieces 5', 5' of the coated optical fiber are cut in the steps of removing the coating of the optical fiber described as above as will be described in greater detail. When the bent parts 26, 26 of the cleaved strip pieces 5', 5' of the coated optical fiber are contacted with the knife edges 9a, 9b', 9b'' or 9a, 9a', 9a'' and the cleaved strip pieces 5', 5' are thus further bent in this state, the strip pieces 5', 5' are initially broken at the bent parts 26, 26, respectively due to their hardness, are then proceeded at the broken state as the bending angles of the bent parts 26, 26 are increased, and are eventually completely fractured at predetermined positions.

In this case, the knife edges 9b, 9b', 9b'' or 9a, 9a', 9a'' do not almost cut out the bent parts 26, and accordingly the cleaved strip pieces are recognized to be fractured due to the breaking phenomenon caused by the bending in the step of removing the coating of the coated optical fiber.

It is noted that, when the cleaved strip pieces 5', 5' of the coating layer of the coated optical fiber are exfoliated in this manner, the bending angle of the strip pieces upon removal of the strip pieces depends variably upon the thickness, the hardness and the like of the coating layer 5 of the coated optical fiber, and the aforementioned complete breakage of the cleaved strip pieces of the coating layer of the coated optical fiber generally occurs before the angle formed between the optical fiber 1 and the cleaved strip piece 5' becomes approx. 90° in FIG. 14.

It should be understood from the foregoing description that since the method of exfoliating the coating of the coated optical fiber according to the present invention carries out the steps of producing a crack at predetermined coating layer by the bending means, cleaving the coating into a plurality of cleaved strip pieces while longitudinally growing the crack and then cutting the strip pieces with the predetermined exfoliating tool engaged on the predetermined position of the coated optical fiber, there are no difficulties in the respective steps, there are no drawbacks such as damage to the optical fiber, and can efficiently exfoliate the coating of the coated optical fiber.

It should also be appreciated that since the exfoliating tool advantageously used for executing the foregoing method can be constructed to simply execute the tool setting work for the coated optical fiber, the breaking work of the coating layer of the optical fiber and the cleaved strip piece removing work and the like, it can efficiently perform the predetermined exfoliating work while avoiding the operating error such as damage to the optical fiber, and since this tool can remove the coating layer not by cutting but rather by the bending breakage of the cleaved strip pieces due to the utilization of the physical properties of the coating layer when exfoliating the coating layer of the optical fiber, it does not cause the early wear of the tool.

What is claimed is:

1. A method of exfoliating a coated optical fiber in which fibrous materials are contained along the longitudinal direction of the optical fiber in the coating layer on the outer periphery of the optical fiber comprising:
   producing a crack of longitudinal direction of the optical fiber in the coating layer at the end of the coated optical fiber to be exfoliated and cleaving the cracked coating layer into a plurality of cleaved strip pieces while growing the crack, and
   outwardly bending the cleaved strip pieces at the edges provided at the positions to be exfoliated of the coating layer as basic points and bending off the cleaved strip pieces at the edges of the coating layer.

2. The method of exfoliating a coated optical fiber according to claim 1, wherein the crack of longitudinal direction of the optical fiber is caused by bending the end of the coated optical fiber.

3. The method according to claim 2, wherein the edges are provided at an exfoliating tool.

4. The method according to claim 3, wherein the exfoliating tool is mounted at the end of the coated optical fiber before or after the crack of the longitudinal direction of the optical fiber is produced in the coating layer at the end of the coated optical fiber.

5. The method according to claim 4, wherein the edges are formed at the exfoliating tool having a body of sleeve or ring shape formed with a drawing hole for the coated optical fiber.

6. The method according to claim 5, wherein the body of the exfoliating tool has tapered part formed at least at one inner or outer periphery.

7. The method according to claim 6, wherein the body of the exfoliating tool has a profile of circular or polygonal section.

8. The method according to claim 7, wherein the drawing hole of the exfoliating tool is similar to the profile of the coated optical fiber.

9. The method according to claim 8, wherein the body of the exfoliating tool has a pair of split pieces.

10. The method according to claim 9, wherein a pair of the split pieces forming the body of the exfoliating tool are mounted at the ends of a pair of grips pivotally secured in X shape.

11. The method according to claim 9, wherein a pair of the split pieces forming the body of the exfoliating tool are relatively openably connected via a hinge.

12. The method according to claim 9, wherein the drawing hole of the body of the exfoliating tool has an anti-skid structure on the inner periphery of the drawing hole.

13. The method according to claim 12, wherein the anti-skid structure is formed of acute projection.

14. The method according to claim 12, wherein the anti-skid structure is formed of a member having high frictional coefficient.

* * * * *